United States Patent [19]

Hirasawa et al.

[11] Patent Number: 5,231,133
[45] Date of Patent: Jul. 27, 1993

[54] THERMOPLASTIC REACTION PRODUCT OF ETHYLENE/UNSATURATED CARBOXYLIC ACID COPOLYMER, AMINE COMPOUND AND POLYEPOXY RESIN

[75] Inventors: Eisaku Hirasawa; Hirohide Hamazaki, both of Ichihara, Japan

[73] Assignee: Dupont Mitsui Polychemicals Co., Ltd., Japan

[21] Appl. No.: 711,277

[22] Filed: Jun. 4, 1991

Related U.S. Application Data

[63] Continuation of Ser. No. 334,792, Apr. 3, 1989, abandoned, which is a continuation of Ser. No. 71,574, Jul. 10, 1987, abandoned, which is a continuation of Ser. No. 803,213, Nov. 27, 1985, abandoned.

[30] Foreign Application Priority Data

Nov. 30, 1984 [JP] Japan .................. 59-253834

[51] Int. Cl.$^5$ .............................. C08L 23/08
[52] U.S. Cl. ...................... 525/113; 525/119
[58] Field of Search .................. 525/113, 119

[56] References Cited

U.S. PATENT DOCUMENTS

| | | | |
|---|---|---|---|
| 3,264,272 | 8/1966 | Rees | 525/339 |
| 3,296,172 | 1/1967 | Funck et al. | 523/332 |
| 3,749,637 | 7/1973 | Reardon et al. | 428/414 |
| 4,018,733 | 4/1977 | Lopez et al. | 525/113 |
| 4,122,128 | 10/1978 | Lehmann et al. | 525/113 |
| 4,332,713 | 6/1982 | Lehmann | 525/113 |
| 4,419,495 | 12/1983 | Davis | 525/113 |
| 4,517,340 | 5/1985 | Read et al. | 525/113 |

FOREIGN PATENT DOCUMENTS

| | | | |
|---|---|---|---|
| 693098 | 8/1964 | Canada | 525/113 |
| 1240709 | 7/1971 | United Kingdom | 525/113 |

*Primary Examiner*—Robert E. Sellers
*Attorney, Agent, or Firm*—Wenderoth, Lind & Ponack

[57] ABSTRACT

A thermoplastic polymer which is the reaction product of (A) at least one copolymer selected from the group consisting of ethylene/unsaturated carboxylic acid copolymers and ionically crosslinked products thereof wherein the ion is a zinc, cobalt, nickel, copper, lead or magnesium ion, (B) a polyamine compound having at least two primary and/or secondary amino groups, and (C) a polyepoxy resin in a proportion corresponding to not more than one epoxy group for one amino group of the polyamine compound; and a process for its production.

5 Claims, No Drawings

THERMOPLASTIC REACTION PRODUCT OF ETHYLENE/UNSATURATED CARBOXYLIC ACID COPOLYMER, AMINE COMPOUND AND POLYEPOXY RESIN

This application is a continuation of now abandoned application Ser. No. 07/334,792 filed on Apr. 3, 1989, which is a continuation of now abandoned Ser. No. 07/071,574 filed Jul. 10, 1987 which is a continuation of now abandoned Ser. No. 06/803,213 filed Nov. 27, 1985, now abandoned.

This invention relates to a novel thermoplastic polymer having excellent rigidity and heat resistance, and to a process for its production.

It has already been disclosed that the reaction of a copolymer of an alpha-olefin and an alpha,beta-ethylenically unsaturated carboxylic acid with a diamine gives a copolymer having improved hardness, weatherability, tensile strength, elasticity and optical properties (see Japanese Patent Publication No. 22,588/1964).

It is also known that a coordinated ionic copolymer having superior hardness, additive holding ability, weatherability and optical transparency can be obtained by at least partly ionizing a copolymer of at least 75 mole % of ethylene and 0.2 to 25 mole % of methacrylic acid with $Cu^{2+}$, $Ni^{2+}$, $Mg^{2+}$ or $Zn^{2+}$, and coordinating at least some of the metal ions with piperazine (see Japanese Patent Publication No. 25624/1971).

It is further known that a modified copolymer having improved adhesion and coatability is obtained by melt-kneading 100 parts by weight of a copolymer of ethylene or an alpha-olefin with an alpha,beta-ethylenically unsaturated carboxylic acid or its ionically crosslinked product with 0.1 to 10 parts by weight of a monoepoxy compound and 0.001 to 2 parts by weight of an amine compound (see Japanese Laid-Open Patent Publication No. 5804/1971).

It was proposed to use a hydroxyl group-containing ethylenic ionomer resin such as the aforesaid modified copolymers of the exterior finishing of automobiles by utilizing its adhesion or coatability (see Japanese Laid-Open Patent Publication No. 25345/1982).

Generally, the ionomer resin which is a partially crosslinked product of an ethylene/unsaturated carboxylic acid copolymer with metal ions has relatively high rigidity, and by utilizing this property, is used as a molding material for automotive molding, golf ball covers, skiing shoes, handles of tools such as a driver, pencil cases, etc. But an ionomer resin having higher rigidity has been desired because of, for example, unsatisfactory toughness for use in automotive bright moldings, or of the need for longer flying distances for use in golf balls.

However, the mechanical properties and heat resistance or heat deformation resistance of the ionomer resin cannot be sufficiently improved by simply increasing the degree of ionization.

The aforesaid ammonium ionic copolymer or coordinated ionic copolymer based on an ethylene/unsaturated carboxylic acid copolymer has fairly high levels of mechanical properties. However, the amount of the diamine to be added is limited, and if it exceeds a certain limit, its plasticizing effect will degrate the mechanical properties of the resulting copolymer. Furthermore, since the diamine added is normally liquid at room temperature or of a relatively low melting point, the heat resistance of the resulting copolymer is reduced markedly. The aforesaid hydroxyl group-containing resin does not show a particular improvement in mechanical properties and heat resistance and rather tends to have much reduced processability (flowability).

It is an object of this invention to provide a novel thermoplastic polymer having excellent rigidity and heat resistance, above all heat resistance, attributed to an ethylenic ionomer resin.

Another object of this invention is to provide a novel thermoplastic polymer which retains sufficient heat meltability despite having such properties as mentioned above.

Still another object of this invention is to provide a process for producing the thermoplastic polymer of the invention.

Further objects of this invention along with its advantages will become apparent from the following description.

According to this invention, the above objects and advantages are achieved by a thermoplastic polymer which is the reaction product of (A) at least one copolymer selected from the group consisting of ethylene/unsaturated carboxylic acid copolymers and ionically crosslinked products thereof (ionomers) wherein the ion is a zinc, cobalt, nickel, copper, lead or magnesium ion, (B) a polyamine compound having at least two primary and/or secondary amino groups, and (c) a polyepoxy resin in a proportion corresponding to not more than one epoxy group for one amino group of the polyamine compound.

The ethylene/unsaturated carboxylic acid copolymers as component (A) ar preferably copolymers of ethylene with unsaturated carboxylic acids having 3 to 6 carbon atoms such as acrylic acid, methacrylic acid, maleic acid and fumaric acid. The proportion of the unsaturated carboxylic acid in the ethylene/unsaturated carboxylic acid copolymer (A) is generally about 0.5 to 15 mole %, preferably about 1 to 8 mole %. If the proportion of the unsaturated carboxylic acid is less than the above-mentioned lower limit a thermoplastic polymer having a small effect of improving rigidity and heat resistance tends to be obtained. The reason for this is not entirely clear, but it is presumably because the concentration of the ammonium ionic crosslinkage or coordinated ionic crosslinkage formed by the reaction of component (A) with the amine compound (B) is decreased. It is larger than the above-mentioned upper limit, the moldability of the resulting thermoplastic polymer tends to be degraded.

Preferably, the ethylene/unsaturated carboxylic acid copolymer (A) has a melt index (MI) in the range of 0.1 to 1000 g/10 min. If the MI of the copolymer is less than 0.1 g/10 min., the resulting thermoplastic polymer tends to have poor flowability and reduced processability. On the other hand, if it is larger than 1000, the resulting thermoplastic polymer tends to have reduced strength.

If desired, a minor proportion of another component such as a n unsaturated carboxylic acid ester, a vinyl ester, or an alpha-olefin may be copolymerized in the copolymer (A). For example, not more than about 10 mole %, preferably not more than 6 mole %, of the unsaturated carboxylic acid ester may be copolymerized.

Zinc, cobalt, nickel, copper, lead or magnesium, which is a metal capable of coordinating with the amine compound (B) is used for ionically crosslinking the ethylene/unsaturated carboxylic acid copolymer to form the ionomers. Sodium and potassium which are typically used like zinc in forming ionomer resins have no property of coordinating with amine compounds to form coordinated ionic copolymers, and therefore cannot be used in the present invention.

For example, when m-xylylenediamine is added to a sodium ionomer of an ethylene/methacrylic acid copolymer, The rigidity of the resulting polymer is rather reduced. Furthermore, since the polymer itself has no ability to hold the amine, m-xylylenediamine will bleed out. Even if an epoxy resin is added to this mixture, the thermoplastic polymer contemplated by the present invention cannot be formed.

Examples of preferred polyamine compounds having at least two primary or secondary amino groups as component (B) include aliphatic amines such as hexamethylenediamine, iminobispropylamine, methyliminobispropylamine, piperazine, bisaminopropylpiperazine, aminoethylpiperazine, 1,3-bisaminomethylcyclohexane and 3,6,8,12-tetraoxa-tetradecane-1,14-diamine, and aromatic diamines such as m-xylylenediamine, p-phenylenediamine and bis(4-aminophenyl)methane.

In contrast to these polyamines, monoamine compounds such as n-hexylamine exhibits a plasticizing effect and rather deteriorates the mechanical properties of the coordinated ionic copolymer. Accordingly, even if such a copolymer is modified with an epoxy resin, a thermoplastic polymer having improved mechanical properties intended by the present invention cannot be formed. With tertiary amines having great steric hindrance such as hexamethylenetetramine, a coordinated bond is not formed sufficiently, and they likewise do not give thermoplastic polymers having improved mechanical properties.

The component (B) is used in a proportion of preferably about 0.5 to 30 parts by weight, more preferably about 2 to 15 parts by weight, per 100 parts by weight of the component (A). Within this range of weight proportion, the polyamine compound (B) is used in such an amount as to provide an amino group content of about 5 to 150 mole % based on the carboxyl groups and/or carboxylate groups of component (A). If the proportion of component (B) is below the specified limit, no marked improving effect is noted in the mechanical properties of the resulting thermoplastic polymer after modification with an epoxy resin. If it is larger than the specified limit, the amine compound will bleed out.

The polyfunctional epoxy resin as component (C) preferably has an epoxy equivalent of about 100 to 10000. In view of handling during actual blending, the polyfunctional epoxy resin is preferably solid and has an epoxy equivalent of about 400 to 5000. Component (C) is used in a proportion corresponding to not more than one epoxy groups for one amino group of the polyamine compound (B), for example, 0.08 to 1 epoxy group per amino group. If the polyepoxy compound (B) is used in such a proportion that the epoxy groups are larger in amount than the amino group, the excess of the epoxy groups react with the carboxyl groups in the copolymer (A) to form an ester linkage where a covalently bonded cross-linkage with the epoxy resin will be formed. This greatly reduces the processability of the final resin obtained after modification with the epoxy group.

Component (C) is used, in other words, in a proportion of preferably about 1 to 200 parts by weight, more preferably about 5 to 100 parts by weight, per 100 parts by weight of the component (A).

According to this invention, the thermoplastic polymer of the invention can be produced by (1) melt-mixing the components (A), (B) and (C) together simultaneously, (2) melt-mixing the components (A) and (B) and then melt-mixing the component (C) further, or (3) first mixing the components (B) and (C) and then melt-mixing the component (A).

If the components (A) and (C) are first mixed and then the component (B) is mixed, an ester linkage is formed as a result of the reaction of the components (A) and (C). Accordingly, this method cannot be used in the present invention.

Any of the methods (1), (2) and (3) of this invention can be carried out by an extruder, roll, etc. known per se at a temperature of about 100° to 300° C., preferably about 150° to 250° C., which are the temperatures above the melting points of the components (A) and (C).

The resulting thermoplastic polymer may be used as a mixture with another thermoplastic resin or a thermosetting resin in amounts which do not substantially deteriorate its favorable properties. For example, to obtain a molded article having especially superior rebound, a sodium- or potassium-type ionomer may be used. Furthermore, as required, an antioxidant, a stabilizer, a lubricant, a tackifier, a thickening agent, a coloring agent, etc. may be added to the thermoplastic polymer.

The thermoplastic polymer of this invention has excellent mechanical properties, especially rigidity, heat resistance, particularly resistance to heat deformation, and flowability.

With regard to mechanical properties, the thermoplastic polymer can be satisfactorily used in the aforesaid fields where an ionomer resin having high rigidity is desired. Furthermore, the polymer of the invention is conveniently used to mold automobile ceiling materials, plastic nets, etc. which require heat resistance.

The thermoplastic polymer of this invention does not have greatly reduced flowability expressed by a melt index as compared with the starting ethylene/unsaturated carboxylic acid copolymer or its divalent metal ionically crosslinked product. This demonstrates that the thermoplastic polymer of this invention fully ensures utility as thermoplastic resins.

The thermoplastic polymer of this invention having these favorable properties at the same time can be used effectively in the aforesaid applications as films, sheets or other molded articles by extrusion, injection molding, compression molding, etc.

The following examples illustrate the present invention in detail. All parts in these examples are by weight.

EXAMPLE 1

In a single screw extruder (screw diameter 30 mm; L/D=32), 100 parts of ethylene/methacrylic acid copolymer (methacrylic acid content 4.7 mole %; MI 60; melting point 90° C.) was mixed with 12.1 parts of 1,3-bisaminomethylcyclohexane by injecting these compounds into the extruder by a pump. The mixture was kneaded in the molten state at a melting temperature of 220° C. with an average resin residence time of 3 minutes while adjusting the rotating speed of the screw to 45 rpm.

One hundred parts of the resulting ammonium ionic ethylenic copolymer was dry-blended with 11.1 parts of a bisphenol A/epichlorohydrin-type epoxy resin (epoxy equivalent 875–1000; softening point 90°–104° C), and the mixture was melt-kneaded under the same conditions as above in an extrude.

The resulting thermoplastic polymer was compression-molded into a predetermined shape. The properties of the polymer and the molded article were measured as follows:

Melt index

Measured substantially in accordance with JIS K-7210-1976 at a temperature of 190° C. under a load of 2160 g.

Flexural rigidity

Measured substantially in accordance with ASTM D-747-70 using a test specimen having a size of 100×20×3 mm.

Hardness (Shore D)

Measured substantially in accordance with JIS K-7215-1979 using a test specimen having a size of 50×20×3 mm.

Tensile properties (stress at yield, tensile strength at break, elongation)

Measured substantially in accordance with JIS K-7113-1977 at a tensile speed of 200 mm/min. using a No. 3 modified test specimen.

Free saq temperature

One end of a test specimen, 100×20×3 mm in size, is fixed horizontally with a fixed width of 30 mm to the upper part (100 mm above the floor surface) of a vertical rod fixed to the floor surface, and the specimen is left to stand in an atmosphere kept at a predetermined temperature for 3 hours. The extent of sagging of the other end of the test specimen at this time is measured at 5° C. intervals, and the relation between the temperature of the atmosphere and the extent of sagging is drawn in a graph. The temperature of the atmosphere at which the extent of sagging reaches 20 mm (heat distortion ratio 20%) is determined from the graph and used a measure of heat resistance.

COMPARATIVE EXAMPLE 1

Example 1 was repeated except that the epoxy resin was not used.

COMPARATIVE EXAMPLE 2

The properties of the ethylene/methacrylic acid copolymer used in Example 1 were measured.

EXAMPLE 2

Example 1 was repeated except that an ethylene/methacrylic acid/isobutyl acrylate terpolymer (methacrylic acid content 3.8 mole %; isobutyl acrylate content 2.6 mole %; MI 35; melting point 85° C.) was used instead of the ethylene/methacrylic acid copolymer, and the amounts of 1,3-bisaminomethylcyclohexane and the epoxy resin used were changed to 5.5 parts and 25.0 parts, respectively.

COMPARATIVE EXAMPLE 3

Example 2 was repeated except that the epoxy resin was not used.

COMPARATIVE EXAMPLE 4

The properties of the ethylene/methacrylic acid-/isobutyl acrylate terpolymer used in Example 2 were measured.

EXAMPLE 3

Example 1 was repeated except that in Zn salt (degree of ionization 20%; MI 14; melting point 91° C.) of the ethylene/methacrylic acid copolymer was used instead of the ethylene/methacrylic acid copolymer, and the amount of 1,3-bisaminomethylcyclohexane was changed to 9.9 parts.

EXAMPLES 4-6

Example 3 was repeated except that the amount of the epoxy resin used was changed to 25.0 parts (Example 4), 42.9 parts (Example 5) or 66.7 parts (Example 6).

COMPARATIVE EXAMPLE 5

Example 3 was repeated except that the epoxy resin was not used.

COMPARATIVE EXAMPLE 6

The properties of the Zn salt of ethylene/methacrylic acid copolymer used in Example 3 were measured

EXAMPLE 7

Example 4 was repeated except that the amount of 1,3-bisaminomethylcyclohexane was changed to 5.3 parts.

COMPARATIVE EXAMPLE 7

Example 7 was repeated except that the epoxy resin was not used.

EXAMPLE 8

Example 7 was repeated except that another bisphenol A-epichlorohydrin type epoxy resin (epoxy equivalent 450-500, softening point 64°-74° C.) was used instead of the epoxy resin used in Example 7.

COMPARATIVE EXAMPLE 8

Example 8 was repeated except that the amount of 1,3-bisaminomethylcyclohexane was changed to 1.0 part (amine molar equivalent<epoxy molar equivalent).

COMPARATIVE EXAMPLE 9

Comparative Example 8 was repeated except that the epoxy resin was not used.

EXAMPLE 9

Example 3 was repeated except that a dry blend of 100 parts of the zinc salt of ethylene/methacrylic acid copolymer with 11.6 parts of the epoxy resin was fed to the feed section of an extruder, and 4.2 parts of 1,3-bisaminomethylcyclohexane was injected into the metering zone of the extruder by means of a pump.

EXAMPLES 10-11

Example 4 was repeated except that 5.0 part of m-xylylenediamine (Example 10) or 5.3 parts of bisaminopropylpiperazine was used instead of 1,3-bisaminomethylcyclohexane.

COMPARATIVE EXAMPLES 10-11 the same methods as in Example 1 are tabulated below.

| Example (Ex.) or Comparative Example (CEx.) | Melt index (g/10 min.) | Flexural rigidity (MPa) | Mechanical properties Hardness (Shore D) | Stress at yield (MPa) | Tensile strength at break (MPa) | Elongation (%) | Free sag temperature (°C.) |
|---|---|---|---|---|---|---|---|
| Ex. 1 | 31 | 522 | 66 | 21.8 | 22.2 | 284 | 65 |
| CEx. 1 | 28 | 439 | 68 | 20.8 | 31.4 | 373 | 59 |
| CEx. 2 | 60 | 60 | 52 | 7.2 | 22.2 | 497 | 66 |
| Ex. 2 | 1.5 | 134 | 50 | 11.0 | 22.3 | 309 | 73 |
| CEx. 3 | 20 | 85 | 47 | 8.8 | 30.4 | 474 | 59 |
| CEx. 4 | 35 | 33 | 40 | 4.4 | 20.2 | 616 | 61 |
| Ex. 3 | 12 | 561 | 67 | 22.3 | 28.9 | 288 | 65 |
| Ex. 4 | 6.2 | 636 | 68 | 24.4 | 24.6 | 223 | 73 |
| Ex. 5 | 2.2 | 692 | 70 | 26.1 | 22.0 | 116 | 77 |
| Ex. 6 | 0.8 | 752 | 71 | 27.9 | 23.8 | 40 | 79 |
| CEx. 5 | 21 | 450 | 66 | 21.8 | 35.4 | 394 | 56 |
| CEx. 6 | 14 | 130 | 58 | 10.3 | 27.7 | 503 | 68 |
| Ex. 7 | 1.6 | 454 | 65 | 21.0 | 25.9 | 258 | 72 |
| CEx. 7 | 15 | 410 | 65 | 20.3 | 33.8 | 406 | 56 |
| Ex. 8 | 0.4 | 505 | 66 | — | — | — | 77 |
| CEx. 8 | (did not flow) | 187 | 61 | — | — | — | 72 |
| CEx. 9 | 15 | 165 | 60 | — | — | — | 64 |
| Ex. 9 | 2.0 | 314 | 61 | 17.8 | 28.0 | 343 | 73 |
| Ex. 10 | 3.5 | 445 | 65 | — | — | — | 74 |
| Ex. 11 | 2.3 | 458 | 66 | — | — | — | 72 |
| CEx. 10 | 24 | 288 | 61 | — | — | — | 58 |
| CEx. 11 | 15 | 303 | 61 | — | — | — | 56 |
| Ex. 12 | 1.8 | 470 | 66 | — | — | — | 73 |
| Ex. 13 | 2.0 | 437 | 66 | — | — | — | 71 |
| CEx. 12 | 16 | 325 | 63 | — | — | — | 57 |
| CEx. 13 | 18 | 292 | 61 | — | — | — | 56 |
| CEx. 14 | 17 | 137 | 58 | — | — | — | 69 |
| CEx. 15 | 37 | 81 | 53 | — | — | — | 58 |
| CEx. 16 | (did not flow) | 149 | 56 | — | — | — | 73 |
| CEx. 17 | (did not flow) | 390 | 60 | — | — | — | 57 |

Examples 10 and 11 were respectively repeated except that the epoxy resin was not used.

EXAMPLES 12-13

Example 4 was repeated except that 5.3 parts (Example 12) of hexamethylenediamine or 5.3 parts of piperazine (Example 13) was used instead of 1,3-bisaminomethylcyclohexane, and that the zinc salt of the copolymer and the diamine compound were first dry blended and then melt-kneaded with the epoxy resin in an extruder.

COMPARATIVE EXAMPLES 12-13

Examples 12 and 13 were respectively repeated except that the epoxy resin was not used.

COMPARATIVE EXAMPLE 14

Example 3 was repeated except that 5.7 parts of n-hexylamine was used instead of 1,3-bisaminomethylcyclohexane.

COMPARATIVE EXAMPLE 15

Comparative Example 14 was repeated except that the epoxy resin was used.

COMPARATIVE EXAMPLE 16

Example 3 was repeated except that the diamine compound was not used.

COMPARATIVE EXAMPLE 17

Example 7 was repeated except that 30 parts of glycidyl methacrylate was used instead of the epoxy resin, and mixed by injection by a pump instead of dry blending.

The results of Example 1 and the results of the other Examples and Comparative Examples determined by

EXAMPLE 14

One hundred parts of a $Pb^{2+}$ salt (degree of ionization 30%) of ethylene/methacrylic acid copolymer (methacrylic acid content 4.7 mole %), 10.0 parts of 1,3-bisaminocyclohexane and 25.0 parts of a bisphenol A-epicholorhydrin type epoxy resin (epoxy equivalent 450-500; softening point 64°-74° C.) were blended and melt-kneaded in a laboratory plastomil at 220° C. for 10 minutes.

When the resulting thermoplastic polymer was compression molded, the molded article had improved rigidity and heat resistance over the starting ionomer resin.

EXAMPLE 15

Example 14 was repeated except that a $Mg^{2+}$ (degree of ionization 30%) salt of ethylene/methacrylic acid copolymer (methacrylic acid content 4.7 mole %) was used instead of the $Pb^{2+}$ salt of ethylene/methacrylic acid copolymer.

When the resulting thermoplastic polymer was compression molded, the molded article had improved rigidity and heat resistance over the starting ionomer resin.

What is claimed is:

1. A thermoplastic polymer which is the thermoplastic reaction product of
    (A) an ethylene/unsaturated carboxylic acid copolymer ionically crosslinked with a zinc ion,
    (B) an aliphatic or aromatic amine compound having at least two primary and/or secondary amino groups, the proportion of said amine compound being about 0.5 to 30 parts by weight per 100 parts by weight of component (A), and (C) a polyepoxy resin in a proportion corresponding to from 0.08 to not more than one epoxy group for one amino group of the amine compound, the proportion of said polyepoxy resin being about 5 to 25 parts by weight per 100 parts by weight of component (A)

said reaction product being an ammonium ionic or coordinated ionic copolymer and having a melt index of 0.4 to 31 g/10 min. which is measured at a temperature of 190° C. under a load of 2160 g.

2. A process for producing a thermoplastic polymer which comprises melt mixing (A) an ethylene/unsaturated carboxylic acid copolymer ionically crosslinked with a zinc ion, (B) an amine compound having at least two primary and/or secondary amino groups, the proportion of said amine compound being about 0.5 to 30 parts by weight per 100 parts by weight of component (A), and (C) a polyepoxy resin in a proportion corresponding to not more than 0.08 to one epoxy group for one amino group of the amine compound, the proportion of said polyepoxy resin being about 5 to 25 parts by weight per 100 parts by weight of component (A), wherein (A) and (B) are melt-mixed and thereafter component (C) is melt mixed therewith, whereby the reaction product of components (A), (B) and (C) is formed, said reaction product being an ammonium ionic or coordinated ionic copolymer.

3. The thermoplastic polymer of claim 1 wherein the proportion of said polyamine compound is about 2 to about 15 parts by weight per 100 parts by weight of component (A).

4. A thermoplastic polymer which is a thermoplastic reaction product prepared in accordance with a method which comprises:

melt mixing (A) an ethylene/unsaturated carboxylic acid copolymer ionically crosslinked with a zinc ion (B) an aliphatic or aromatic amine compound having at least two primary and/or secondary amino groups, the proportion of said amine compound being about 0.5 to 25 parts by weight per 100 parts by weight of component (A), and (C) a polyepoxy resin in a proportion corresponding to from 0.08 to not more than one epoxy group for one amino group of the amine compound, the proportion of said polyepoxy resin being about 5 to 30 parts by weight per 100 parts by weight of component (A), wherein components (A) and (B) are melt mixed and thereafter (C) is melt mixed therewith, said reaction product being an ammonium ionic or coordinated ionic copolymer.

5. A thermoplastic polymer which is the thermoplastic reaction product of (A) an ethylene/unsaturated carboxylic acid copolymer ionically crosslinked with a zinc ion, (B) an aliphatic or aromatic amine compound selected from the group consisting of hexamethylenediamine, iminobispropylamine, methyliminobispropylamine, piperazine, bisaminopropylpiperazine, aminoethylpiperazine, 1,3-bisaminomethylcyclohexane, 3,6,9,12-tetraoxatetradecane-1,14-diamine, m-xylylenediamine, p-phenylenediamine, (bis(4-aminophenyl)-methane and a mixture thereof, the proportion of said amine compound being about 0.5 to 30 parts by weight per 100 parts by weight of component (A), and (C) a polyepoxy resin in a proportion corresponding to from 0.08 to not more than one epoxy group for one amino group of the amine compound, the proportion of said polyepoxy resin being about 5 to 25 parts by weight per 100 parts by weight of component (A) said reaction product being an ammonium ionic or coordinated ionic copolymer and having a melt index of 0.4 to 31 g/10 min. which is measured at a temperature of 190° C. under a load of 2160 g.

* * * * *